United States Patent [19]

Cooper, Sr.

[11] 3,999,693
[45] Dec. 28, 1976

[54] PORTABLE LUGGAGE CARRIER FOR COMPACT CARS

[76] Inventor: Terry Cooper, Sr., 3625 Eudora St., Denver, Colo. 80207

[22] Filed: Mar. 24, 1975

[21] Appl. No.: 561,531

[52] U.S. Cl. .................. 224/42.03 A; 296/1 C; 296/37.1
[51] Int. Cl.² .......................................... B60R 9/06
[58] Field of Search ............ 224/42.03 R, 42.03 A, 224/42.42 R, 42.43, 29 R, 42.01; 296/1 C, 37 R

[56] References Cited

UNITED STATES PATENTS

| | | | |
|---|---|---|---|
| 1,575,074 | 3/1926 | Nordgren | 224/42.03 A |
| 1,776,890 | 9/1930 | Dart | 224/42.03 A |
| 1,815,943 | 7/1931 | Glenn | 224/42.03 R |
| 2,474,974 | 7/1949 | Fulton, Jr. et al. | 296/1 C |
| 3,161,973 | 12/1964 | Hastings | 224/42.03 R |
| 3,202,332 | 8/1965 | Walker | 224/42.03 A |
| 3,228,576 | 1/1966 | Gaukel | 224/42.03 A |
| 3,687,344 | 8/1972 | Nixon | 224/42.03 A |
| 3,762,758 | 10/1973 | Wilkerson | 224/42.03 A |

*Primary Examiner*—Robert J. Spar
*Assistant Examiner*—Donald W. Underwood
*Attorney, Agent, or Firm*—Bertha L. MacGregor

[57] ABSTRACT

The invention disclosed herein is a portable luggage carrier for compact automobiles usually devoid of storage space accessible externally of the cars. The luggage carrier housing is shaped to provide a forwardly facing wall complemental to the rear wall of the automobile, and is provided with attachment means including a knee brace and existing bumper engaging means. A gasoline conduit connects the existing gas inlet means to a gas inlet and closure cap in the carrier top. The rear wall of the carrier housing is provided with a license plate recess and light and with tail lights which match the tail lights of the car covered by the carrier. A bumper is attached to the sides of the carrier housing and extends across the carrier rear wall.

2 Claims, 6 Drawing Figures

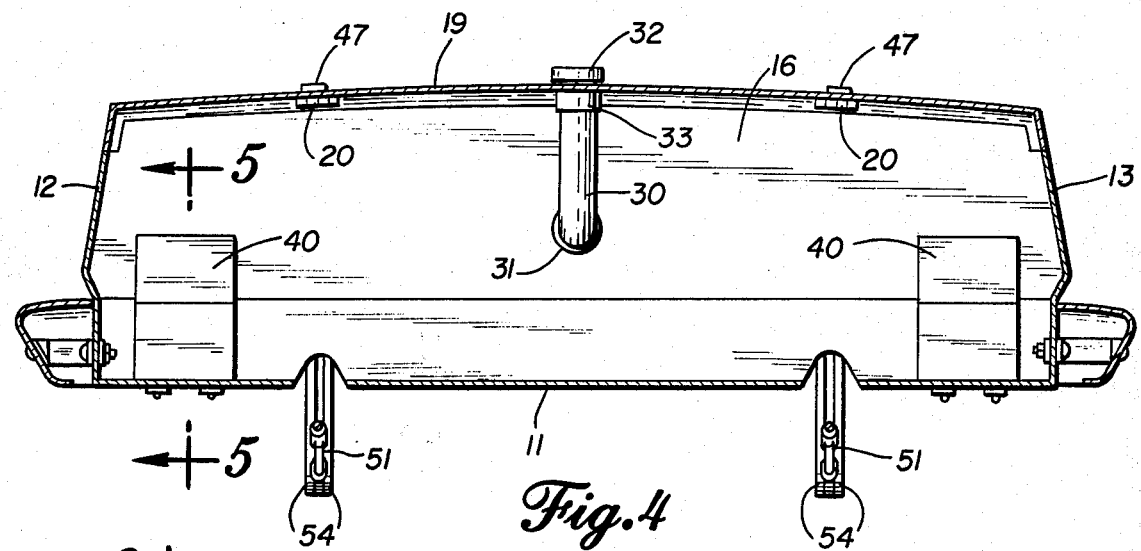
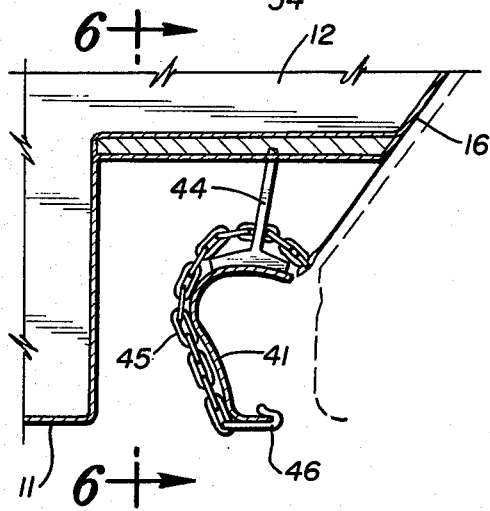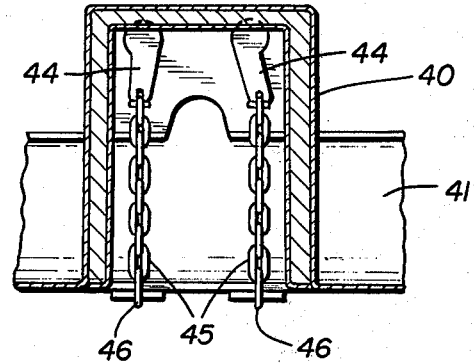

PORTABLE LUGGAGE CARRIER FOR COMPACT CARS

BACKGROUND OF THE INVENTION

Many automobiles of the "compact" type are devoid of trunks for storage space accessible externally of the car bodies and rely for storage purposes on relatively small space between the passenger seats and rear wall of the car. Attempts have been made to provide additional storage space in standard cars equipped with trunks by extending the trunk walls upwardly or rearwardly, or in providing slidable drawer-like additions to such trunks, but these alterations are unsightly, and not practical for compact cars initially without any trunks.

This invention is designed for compact cars which have limited storage space within the car bodies and are devoid of externally accessible trunks or storage housings.

DESCRIPTION OF THE PRIOR ART

Applicant is not aware of any prior art disclosing a portable luggage carrier for compact cars, or any carrier comprising a housing shaped to provide a forward facing wall which is complemental to the rear wall of the automobile, and provided with attachment means for easy mounting of the carrier, such that the assembly has the appearance of an automobile initially equipped with a built-in luggage carrier.

OBJECTS OF THE INVENTION

The main object of the invention is to provide a portable luggage carrier for compact cars, in which a forwardly facing wall is complemental to the rear wall of the car, and the rear wall of the carrier is provided with a license plate recess and light, as well as two tail lights, which function to replace the corresponding parts in the existing automobile covered by the carrier.

Another object of the invention is to provide means for receiving gasoline in the top of the carrier and conveying it to the existing gas filler inlet.

Another object is to provide the carrier with a bumper which serves as the rear bumper for the car, and to provide the carrier with attachment means for engaging the existing bumper of the car, and attachment means for supporting the carrier in its attached position.

Another object is to provide an assembly which has the appearance of an automobile initially equipped with a built-in luggage carrier.

BRIEF DESCRIPTION OF THE DRAWINGS

FIG. 4 is a transverse, vertical sectional view, in the plane of the line 4—4 of FIG. 3.

FIG. 5 is an enlarged vertical sectional view of the bumper hitch and mounting used to anchor the carrier on the car bumper, in the plane of the line 5—5 of FIG. 4.

FIG. 6 is a sectional view in the plane of the line 6—6 of FIG. 5.

DESCRIPTION OF THE PREFERRED EMBODIMENT

Figure 1:
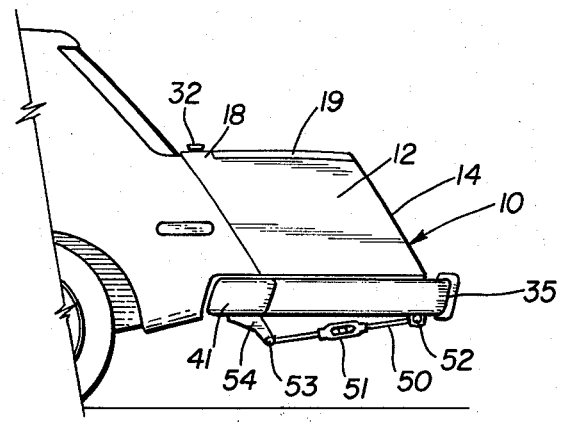
FIG. 1 is an elevational side view of a portable luggage carrier for compact cars, embodying my invention, and of the rear portion of a compact automobile on which the carrier is mounted.
Figure 2:
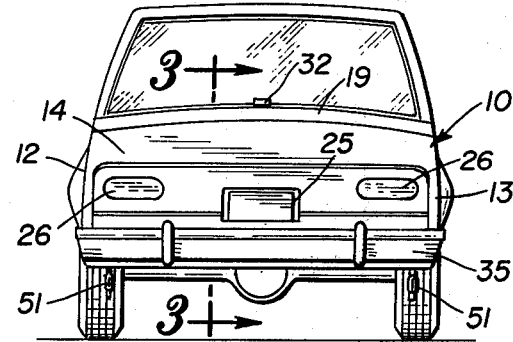
FIG. 2 is an elevational rear view of the same.

In the preferred embodiment of the invention shown in the drawings, the luggage carrier 10 comprises a housing having a floor 11, side walls 12, 13, exposed rear wall having an inclined portion 14 and vertical portion 15, and a forwardly facing wall 16 which is generally complemental to the existing rear of the compact car 17 on which the carrier 10 is mounted. Part of the top 18 of the carrier is a hinged lid 19 connected to the top by hinges 20. The compact automobile 17 has a downwardly and rearwardly inclined rear wall and therefore the wall 16 of the carrier is shaped to be complemental to said vehicle rear wall, but the complemental walls may vary in form.

The exposed rear wall portion 14 of the carrier is provided with a license plate recess 25 and tail lights 26. A license plate light 27 is located above the recess 25. The lights are wired at 28 to existing wiring in the car 17.

A gasoline conduit 30 extends from the existing gas inlet and cap 31 in the car 17 to an opening and closure cap 32 in the top 18 of the carrier 10, the conduit 30 being connected to the top 18 to communicate with the opening as indicated at 33.

The carrier 10 includes a bumper 35 provided with side arms 36 by which the bumper 35 is rigidly attached to the carrier 10. Preferably the carrier is made of reinforced fibreglass and is provided with molded reinforced areas 37 adjacent the rear vertical wall portion 15 to facilitate attachment of the bumper 35, as shown in FIG. 3.

Figure 3:
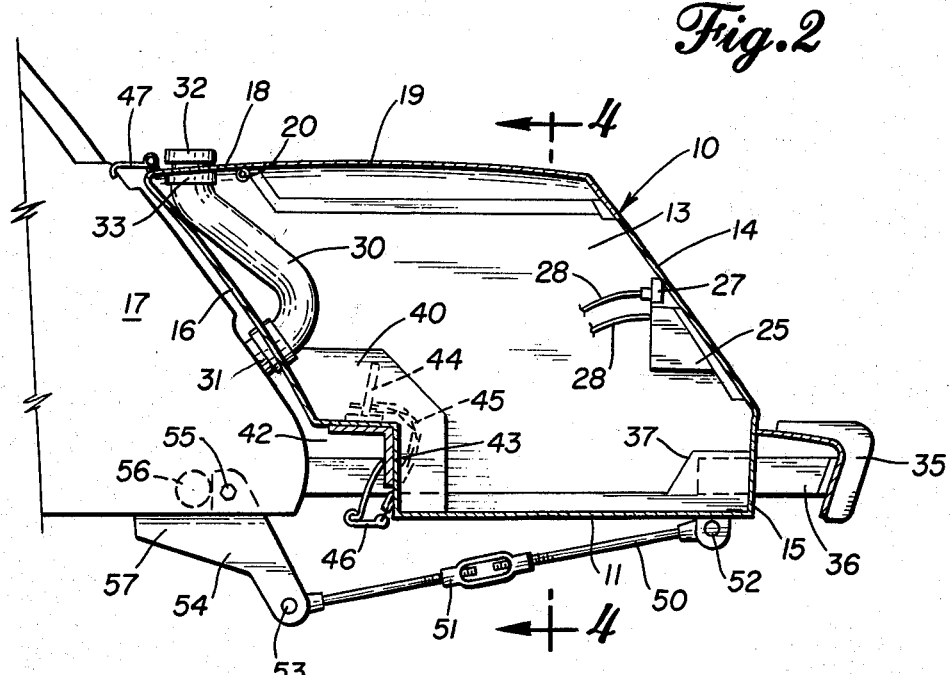
FIG. 3 is a longitudinal vertical sectional view, partly in elevation, in the plane of the line 3—3 of FIG. 2, on an enlarged scale.

The carrier body is shaped as indicated at 40 in FIG. 3, to accommodate the existing bumper 41 on the compact car 17 which extends into the space 42. The complemental wall 16 of the carrier is provided with a bracket 43 and chain mounting means 44 on which chains 45 are attached. The chains 45 are of suitable length and provided with hooks 46 on their lower free ends to engage the existing bumper 41 on the car 17. The carrier body may be thickened in the molding process to provide reinforced areas for mounting the aforementioned parts. The upper edge of the carrier is provided with attachment means 47.

A steel knee brace 50 with turn-buckle 51 is pivotally connected at 52 to the floor 11 of the carrier at each side of its rear end and pivotally connected at 53 at its forward end to a stirrup plate 54 bolted at 55 to the car 17 side walls at each side. The connection 55 is adjacent the car spring 56, with the shoulder 57 of the plate 54 bearing on the spring 56.

Thus the carrier 10, with license plate holder, tail lights and bumper, conceals corresponding parts of the compact car, and is equipped with mounting means quickly and easily attachable to the car and its bumper. The appearance of the assembly is that of an automobile initially equipped with a built-in luggage carrier.

I claim:

1. In combination with a compact car devoid of a rearwardly enclosed accessible storage space, the rear wall of the car being downwardly and rearwardly inclined and provided with a fuel intake opening, a portable luggage carrier which gives the assembled car and carrier the appearance of an automobile equipped with a built-in luggage carrier, comprising
   a. a luggage carrier housing having a forwardly facing wall generally complemental to the rearwardly downwardly inclined rear wall of the car, and having a rear wall generally conforming to the inclination of the carrier forwardly facing wall, the carrier housing having side walls which have edge contact with the car body,
b. a carrier top wall extending over the carrier between its side walls and connected to the car rear wall,
c. the top wall having an opening closed by a cover hingedly connected to the carrier top wall,
d. a fuel intake opening in the carrier top located between the hinge connection of the cover and the car, and
e. a fuel conduit between the fuel intake opening in the carrier top and in the rear wall of the car.

2. The invention defined by claim 1, which includes a bumper, side arms on the bumper connected to the carrier housing, and an intermediate portion extending across the rear wall of the housing below said rearwardly downwardly inclined portion of the rear wall, and in which the forwardly facing rear wall of the carrier housing has a lower transverse recessed portion which receives part of an existing bumper on the compact car when the carrier housing is mounted on the car.

* * * * *